(12) United States Patent
Hughes et al.

(10) Patent No.: US 10,858,559 B2
(45) Date of Patent: *Dec. 8, 2020

(54) MATERIAL MIXING SYSTEM

(71) Applicant: Douglas Dynamics, LLC, Milwaukee, WI (US)

(72) Inventors: Everett Hughes, Troy, MI (US); Greg Neilson, Troy, MI (US); Paul Yagiela, Rochester Hills, MI (US)

(73) Assignee: Douglas Dynamics, LLC, Milwaukee, WI (US)

( * ) Notice: Subject to any disclaimer, the term of this patent is extended or adjusted under 35 U.S.C. 154(b) by 28 days.

This patent is subject to a terminal disclaimer.

(21) Appl. No.: 15/856,829

(22) Filed: Dec. 28, 2017

(65) Prior Publication Data

US 2018/0118989 A1 May 3, 2018

Related U.S. Application Data

(62) Division of application No. 14/460,667, filed on Aug. 15, 2014, now Pat. No. 9,890,310.

(51) Int. Cl.
*B01F 5/00* (2006.01)
*B01F 15/00* (2006.01)
(Continued)

(52) U.S. Cl.
CPC ............ *C09K 3/185* (2013.01); *B01F 1/0022* (2013.01); *B01F 5/0057* (2013.01); *B01F 15/00227* (2013.01); *B01F 15/0251* (2013.01); *B01F 15/0408* (2013.01); *B01F 15/0458* (2013.01); *B02C 13/02* (2013.01); *B02C 23/20* (2013.01)

(58) Field of Classification Search
CPC ......... C09K 3/185; C09K 3/18; B01F 1/0022; B01F 15/0458; B01F 15/0408; B01F 15/0251; B01F 5/0057; B01F 15/00227; B01F 15/0234; B01F 15/0235; B01F 2015/0204; B02C 13/02; B02C 23/20; B02C 23/18; E01H 10/00; E01H 10/005; E01H 10/007; E01H 8/10; B65G 65/30; B65G 65/34; B65G 65/40; B65G 65/42; B65G 65/425; B65G 65/46; B65G 65/48; B65G 69/12; B65G 69/24; B65G 69/06; B65G 2812/03; B65G 2812/0304;
(Continued)

(56) References Cited

U.S. PATENT DOCUMENTS 1,864,947 A * 6/1932 Selfridge .................. B01F 3/12
366/133
2,200,757 A * 5/1940 Miller ..................... B01F 15/02
222/145.6
(Continued)

*Primary Examiner* — Joseph W Drodge
(74) *Attorney, Agent, or Firm* — William H. Honaker; Dickinson Wright PLLC

(57) ABSTRACT

The invention relates generally to a mixing system for mixing a dry material with a liquid. The mixing system includes a supply of dry material and a supply of liquid. An infinitely variable metering device meters the dry material into the liquid. A sensor senses the ratio of dry material to liquid. The sensor is operatively connected to the metering device to control the metering device to obtain a desired ratio of dry material to liquid. The dry material is dispensed volumetrically by volume of liquid to form the desired ratio of dry material to liquid.

13 Claims, 6 Drawing Sheets

(51) Int. Cl.
*B01F 15/02* (2006.01)
*B01F 15/04* (2006.01)
*B02C 13/02* (2006.01)
*B02C 23/20* (2006.01)
*C09K 3/18* (2006.01)
*B01F 1/00* (2006.01)

(58) Field of Classification Search
CPC ........ B65G 2812/05; B65G 2812/0505; B65G 2812/0511; B65G 2812/0527
USPC .................. 366/151.1, 152.1–153.1, 154.2, 366/162.1–162.3, 165.1, 182.1; 239/650, 239/651, 661–663, 668, 672–689; 222/160, 161, 167, 169, 226
See application file for complete search history.

(56) References Cited

U.S. PATENT DOCUMENTS

| | | | | |
|---|---|---|---|---|
| 2,314,421 A * | 3/1943 | Peterson | ........... | B01F 15/00155 366/152.1 |
| 2,422,062 A * | 6/1947 | Yard | ........... | C02F 1/686 366/155.2 |
| 2,442,743 A * | 6/1948 | Wester | ........... | B60P 1/40 239/657 |
| 2,626,787 A * | 1/1953 | Harper | ........... | B01F 15/042 137/101.19 |
| 2,831,444 A * | 4/1958 | Schill | ........... | A01C 19/00 111/52 |
| 2,879,042 A * | 3/1959 | Jones | ........... | B01F 15/0454 366/162.2 |
| 3,076,700 A * | 2/1963 | Renner | ........... | C05C 9/005 71/29 |
| 3,212,674 A * | 10/1965 | Martin | ........... | G01F 3/38 222/67 |
| 3,236,527 A * | 2/1966 | Suyder | ........... | A01C 3/063 239/656 |
| 3,343,919 A * | 9/1967 | Miller | ........... | B01F 1/0022 422/106 |
| 3,371,190 A * | 2/1968 | Meyer | ........... | B23K 15/08 219/384 |
| 3,429,418 A * | 2/1969 | Fyrk | ........... | A01C 17/00 239/656 |
| 4,335,964 A * | 6/1982 | Drake | ........... | B01F 15/0201 222/239 |
| 4,336,910 A * | 6/1982 | Judson, Jr. | ........... | B01F 13/06 241/246 |
| 5,125,535 A * | 6/1992 | Ohlman | ........... | G01G 11/083 222/77 |
| 6,202,894 B1 * | 3/2001 | Struminski | ........... | B67D 1/0037 222/129.3 |
| 6,357,906 B1 * | 3/2002 | Baudoin | ........... | B01F 5/0206 366/136 |
| 7,540,436 B2 * | 6/2009 | Truan | ........... | A01C 15/006 222/161 |
| 9,890,310 B2 * | 2/2018 | Hughes | ........... | B02C 13/02 |
| 2004/0042335 A1 * | 3/2004 | Cecala | ........... | A01C 23/042 366/151.1 |
| 2004/0124260 A1 * | 7/2004 | Ward | ........... | E01H 10/007 239/146 |
| 2018/0028992 A1 * | 2/2018 | Stegemoeller | ........ | B01F 5/0065 |

\* cited by examiner

MATERIAL MIXING SYSTEM

CROSS REFERENCE TO RELATED APPLICATION

This divisional application claims priority to U.S. application Ser. No. 14/460,667 filed Aug. 15, 2014, which is incorporated herein by reference in its entirety.

BACKGROUND OF THE INVENTION

1. Field of the Invention

This invention relates generally to material mixing systems, and more specifically to an economical continuous material mixing system which is particularly beneficial in the production of liquid de-icer, such as brine for use in the control of ice control.

2. Description of the Prior Art

Brine making equipment is well known in the art. Typical brine making systems use a mixing tank and a storage tank. The mixing tank receives bulk salt and water is pumped into the tank to mix with the salt. The water is pumped into the tank through large water pipes, typically 2 to 2.5 inches in diameter. As the water circulates with the bulk salt, salt is dissolved into the water until the correct salinity is reached.

In one type of system, a flow through system, the salinity of the mixture is controlled by the addition of salt or water to the mixing tank until the correct salinity is reached. An example of a flow through brine making system can be found in U.S. Pat. No. 7,186,390, assigned to Duolift Mfg. Co., Inc.

In another type system, a re-circulation system, the brine mixture is re-circulated back through the salt until the proper salinity is reached. Sensors can be used to indicate the correct salinity. Once the proper salinity is reached, the brine is pumped to a storage tank. U.S. Pat. Nos. 7,810,987; 7,897,022; 8,251,569; and 8,382,364, assigned to Cargill Incorporated, disclose a re-circulation type brine making system.

The problem with the flow through systems is the need to continuously add salt or water to get the correct solution. This requires continuous monitoring by an operator. The problem with re-circulation type systems is their complexity and cost. These systems require complex piping, controls and control valves to sense the salinity and re-route it back through the mixing tank until the correct salinity is obtained. Then, when the correct salinity is obtained, re-route the saline solution to storage tanks.

Another problem with known brine making systems is the need to regularly clean the system. The use of bulk salt leaves salt that has not dissolved and debris that accumulates in the tanks. The need to clean the systems results in down time of the system.

SUMMARY OF THE INVENTION

The present invention provides a continuous bulk material mixing system for continuously producing a solution, such as a liquid de-icer, for example brine. The mixing system includes a supply of dry additive, such as salt or other de-icing material and a supply of liquid. In the preferred embodiment, the bulk material is bulk salt, the fluid is water and the fluid mixture is brine. As is well known, salinity of a brine mixture for use in ice control is 23.3% by weight. The present invention continuously makes brine at the correct salinity.

An infinitely variable metering device meters the dry additive for addition to the liquid. A sensor continuously senses the ratio of additive to liquid. The sensor is operatively connected to the metering device to control the metering device to obtain the desired ratio of additive to liquid and continuously maintain the proper ratio. In this way, the dry additive is dispensed volumetrically by volume of liquid to reach the desired ratio of additive to liquid on a continuous basis.

The present invention overcomes the problems associated with typical brine production systems. When producing brine, the present system pre-conditions the salt prior to introduction into a mixing bowl. The pre-conditioned salt mixes much more quickly and completely than bulk rock salt. Also, it has been found that the pre-conditioned rock salt results in substantially less debris and salt being left in the tanks resulting in reduced clean up.

The system also meters the amount of salt being added to the water in response to continuous monitoring of the salinity of the brine mixture. The system is in a loop, wherein it continuously monitors the salinity of the mixture, conveys that information to a control that then meters in an appropriate amount of salt. As water is added, more salt is metered into the system automatically. If the salinity is low, the controller automatically signals the metering device to provide more salt. This additional salt can be delivered slowly if the salinity is slightly low, or more quickly if the salinity is at a much lower level, such as at startup. The ability to meter the salt is infinite. If the salinity is correct, the controller signals the metering device to stop or slow down. Mixing of the salt and water is continuously monitored and the salt is pre-conditioned for maximum mixing. The present invention continuously makes brine in less time and with less waste than conventional brine production equipment and requires very little cleanup.

The invention will be described in connection with the manufacture of brine, but it should be understood by those of ordinary skill in the art that other bulk material could be used to produce other kinds of solutions.

In the disclosed embodiment, the material mixing system includes a hopper adapted to contain a quantity of bulk salt. The hopper has a first opening for receiving salt and a second opening for discharging salt. A metering unit is positioned adjacent the second opening. The metering unit is adapted to meter salt from the hopper to a salt conditioner. The metering unit is infinitely variable.

A disclosed metering device includes a shaft and a plurality of fingers extending radially outwardly from the shaft. The fingers sweep salt from within the hopper to a salt conditioner. A motor is operatively connected to the metering device and a controller is operatively connected to the motor. The controller controls the motor to meter salt from within the hopper to the salt conditioner as required for maintaining a pre-determined salinity of the brine. The motor can be either an 110V or 220V motor.

The mixing bowl includes a salinity sensor mounted within the mixing bowl. The salinity sensor communicates with the controller to control the salinity of the brine.

The salt conditioner is adapted to receive the bulk salt from the metering device. The salt conditioner conditions the salt to form a conditioned salt that is easy to mix with water. The mixing bowl has at least one water inlet for supplying water to the mixing bowl. The mixing bowl has an outlet adapted to discharge the brine to a storage tank, etc.

In the disclosed embodiment, the salt conditioner is a hammer mill. Although, it should be understood that other conditioners can be used, such as for example a rotary concave.

The mixing bowl of the present invention includes a plurality of nozzles positioned about the bottom and sides of the mixing bowl to circulate the water to facilitate mixing of the salt and water. Due to the use of conditioned material, a simple garden hose and water spigot can be used to supply water to the mixing bowl. In the preferred embodiment a pump and nozzles are used to more fully circulate the water and salt.

The mixing bowl includes a bottom outlet that can be opened to drain the mixing bowl and rinse out any accumulated residue, which due to the pre-conditioned salt is minimal when compared to other brine making equipment.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

The material mixing system of the present invention is shown generally at 10. The material mixing system 10 is particularly useful in the production of brine. The brine solution of salt and water and may include additives to improve the overall performance of the solution for controlling ice. Typically, the bulk rock salt is initially solid pieces which are processed to very small pieces and then mixed with water, and if desired additives, to create the brine solution. However, the invention is not limited to the manufacture of a brine solution, for example, the solution could be an ice control chemical such as magnesium chloride or calcium chloride as well as a combination of these with salt to produce a liquid solution for controlling ice. The invention is also not limited to ice control, as it can also be used to mix for example fertilizers. The liquid solution could be a fertilizer solution with the dry fertilizer processed for addition to the water. Any number of fertilizers could be used including but not limited to organic fertilizers, inorganic fertilizers, potash, etc. The invention could also be used with dry weed control substances that have to be processed and added to water, etc.

For ease of explanation, the invention will be described with respect to producing salt brine. However, as those of ordinary skill will understand, and as described above, other uses are clearly contemplated for the present invention.

The material hopper 12 receives the bulk rock salt or other material. As will be appreciated by those of ordinary skill in the art, the rock salt is typically not uniform in composition, shape, or size. The composition may be harder or softer salt depending upon its origin and there may be sand pebbles, rocks or other debris in the mix. The shape and size can be anywhere from very fine to very large chunks in a single batch. Because of the inconsistency in the make up of the rock salt, further processing is required to improve the ease of mixing the salt with water in the mixing bowl 18 and to facilitate cleanup.

Figure 3:
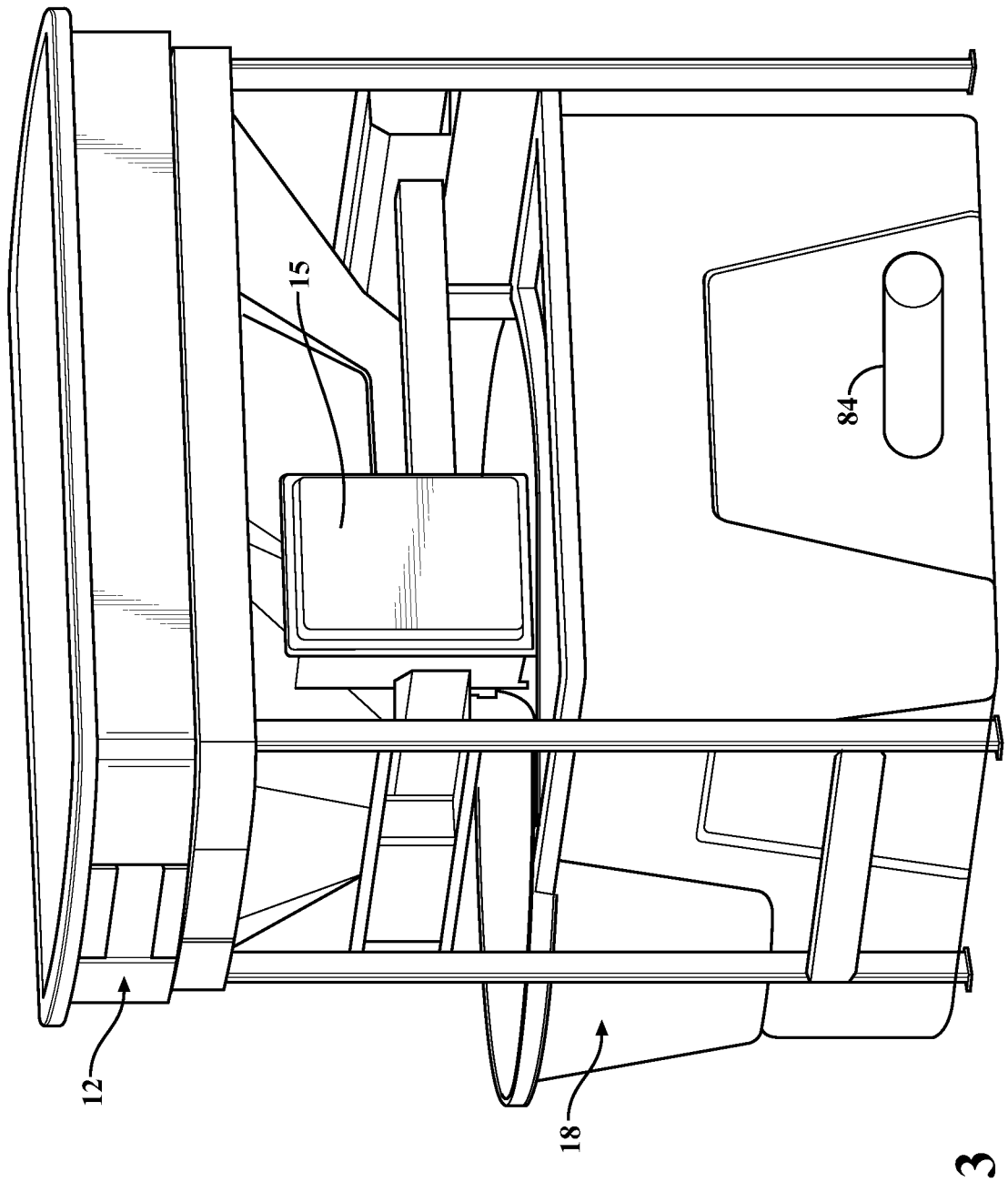
FIG. 3 is a perspective view of from the rear of the material mixing system of the present invention.

The hopper 12 as illustrated has an opening 22 for the receipt of the rock salt and an exit 24 for delivery of the rock salt to a metering unit 14 and then to a material conditioner or processor 16. The metering unit 14 is positioned adjacent the exit 24 to meter rock salt to the material conditioner or processor 16. A programmable control unit 15, see FIG. 3, controls the metering unit 14 to deliver the correct amount of salt to the processor 16. The programmable control unit 15 receives information from a sensor 17. The sensor 17 senses the salinity of the mixture and relays that information back to the unit 15 to control the delivery of material to the conditioner 16. In the disclosed embodiment, the sensor is a toroid conductivity cell or transmitter, but could also be any typical conductivity sensor including a refractory sensor, specific gravity sensor, galvometric sensor, electric conductivity sensor, etc.

Figure 1:
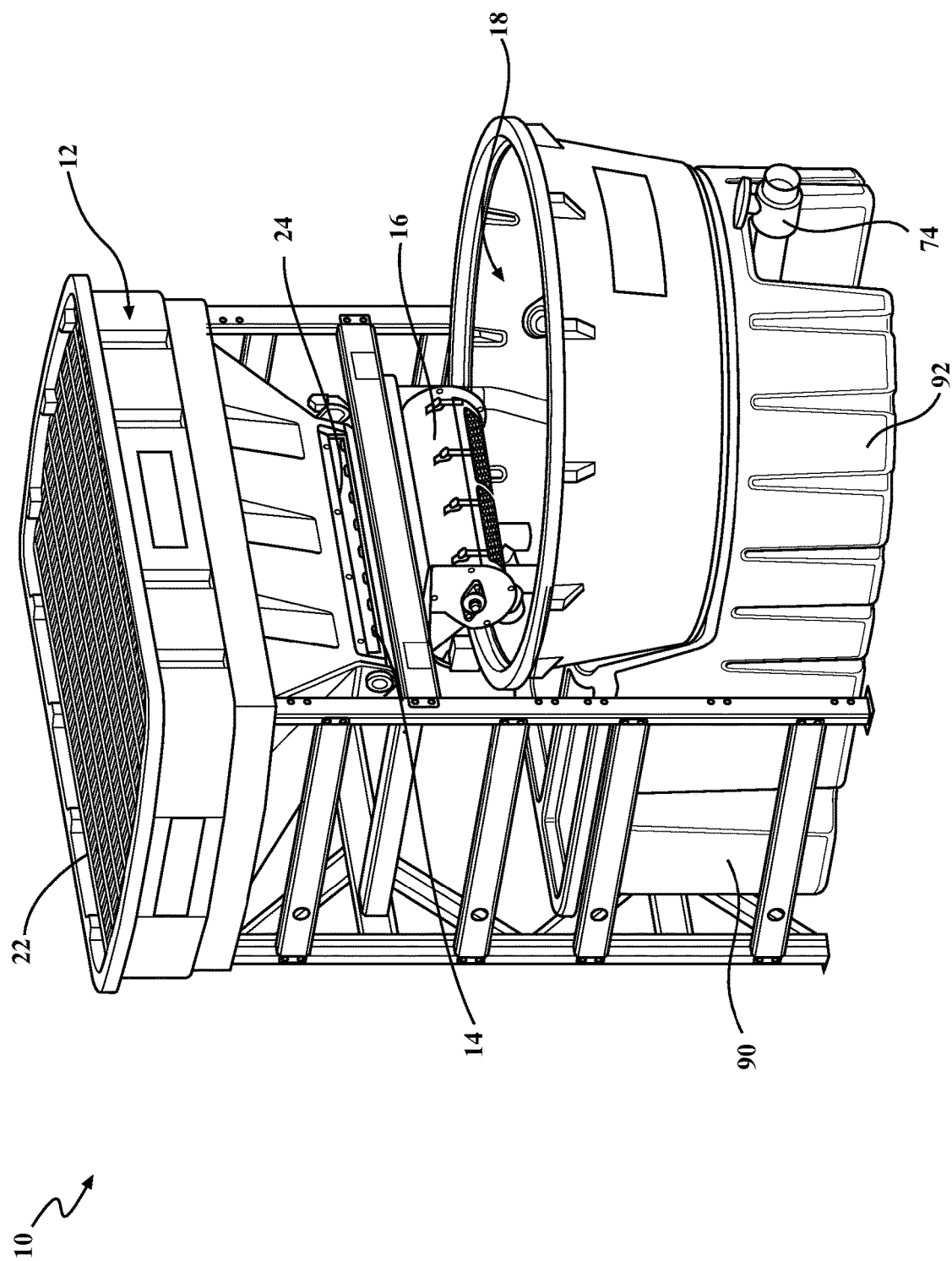
FIG. 1 is a perspective view of the material mixing system of the present invention.
Figure 2:
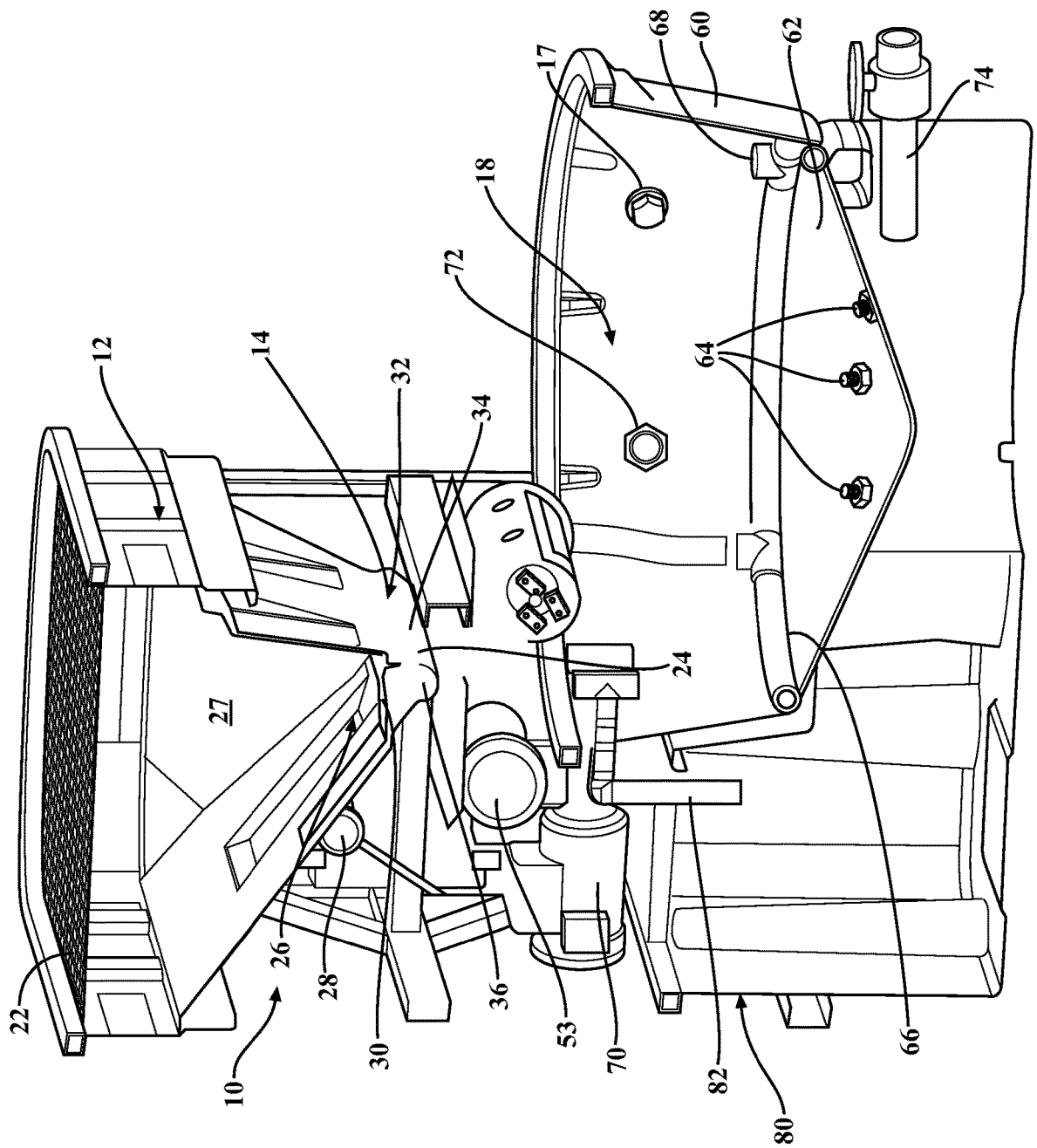
FIG. 2 is a cutaway view perspective view of the material mixing system of the subject invention.

With reference to FIG. 2, a vibrator assembly 26 is positioned in the hopper 12 adjacent to the exit 24 to facilitate the constant flow of rock salt to the metering unit 14. The vibrator assembly 26 includes a vibrator motor 28, which can be either 110V or 120V, connected to a vibrator plate 30. In the preferred embodiment, the plate 30 extends across the exit 24 of the hopper 12. In the disclosed embodiment, the plate is flat. The width of the plate is less than the width of the hopper walls 27 adjacent the exit 24. In this way, when the plate is vibrated, the salt directly adjacent the plate is vibrated and moves to and drops though the gaps between the hopper walls 27 and the plate 30 and is delivered to the metering unit 14. The plate holds the weight of the material off the metering unit and prevents cavitation of the material. As a result, there is a free flow of material to the metering unit 14.

The vibrator plate 30 can take other shapes, such as for example, a v-shaped plate that presents a knife-like edge in the direction of the opening 22. When the vibrator is operational, the knife-like edge of the plate 30 vibrates the rock salt to prevent cavitation and facilitate flow to the exit 24. The plate 30 is generally spaced directly above and adjacent the exit 24 with the sides of the plate 30 spaced from the walls 27 of the hopper 12. In this way, the rock salt can flow over the plate 30 and though the gaps between the edges of the plate 30 and the walls 27 of the hopper 12 to the exit 24. It should be appreciated that other shaped plates 30 could also be used, for example a curved plate could be used.

To further facilitate the continuous flow of material to the metering unit 14, the hopper 12 has sloped inner walls 27 to direct the salt within the hopper 12 to the exit 24. It has been found that the sloped inner walls 27 facilitate the delivery of the salt to the exit 24. It should be appreciated by those of ordinary skill in the art, that the amount of slope is a matter of design choice and other angles and slopes could be used.

It should also be appreciated by those of ordinary skill in the art, that the vibrator and sloped walls might not be needed in some hopper designs. For example, the hopper could be cylindrical and not require the sloped walls; or, the hopper could utilize a conveyor to convey the salt to the metering device and not require the vibrator or sloped walls, etc.

The metering unit 14 is illustrated in FIG. 2 and includes a beater bar 32 having a plurality of fingers 34 located at or near the bottom 36 of the hopper 12 that extend across the bottom 36 for moving material to the exit 24. As shown in FIG. 2, there are three sets of paddles 34 radially disposed on the outside of the beater bar 32. It should be appreciated by those of ordinary skill the art, that one of more sets of fingers 34 could be used. As the beater bar 32 rotates, the fingers 34 pick-up material in the bottom 36 and supply that material to the exit 24.

Figure 4:
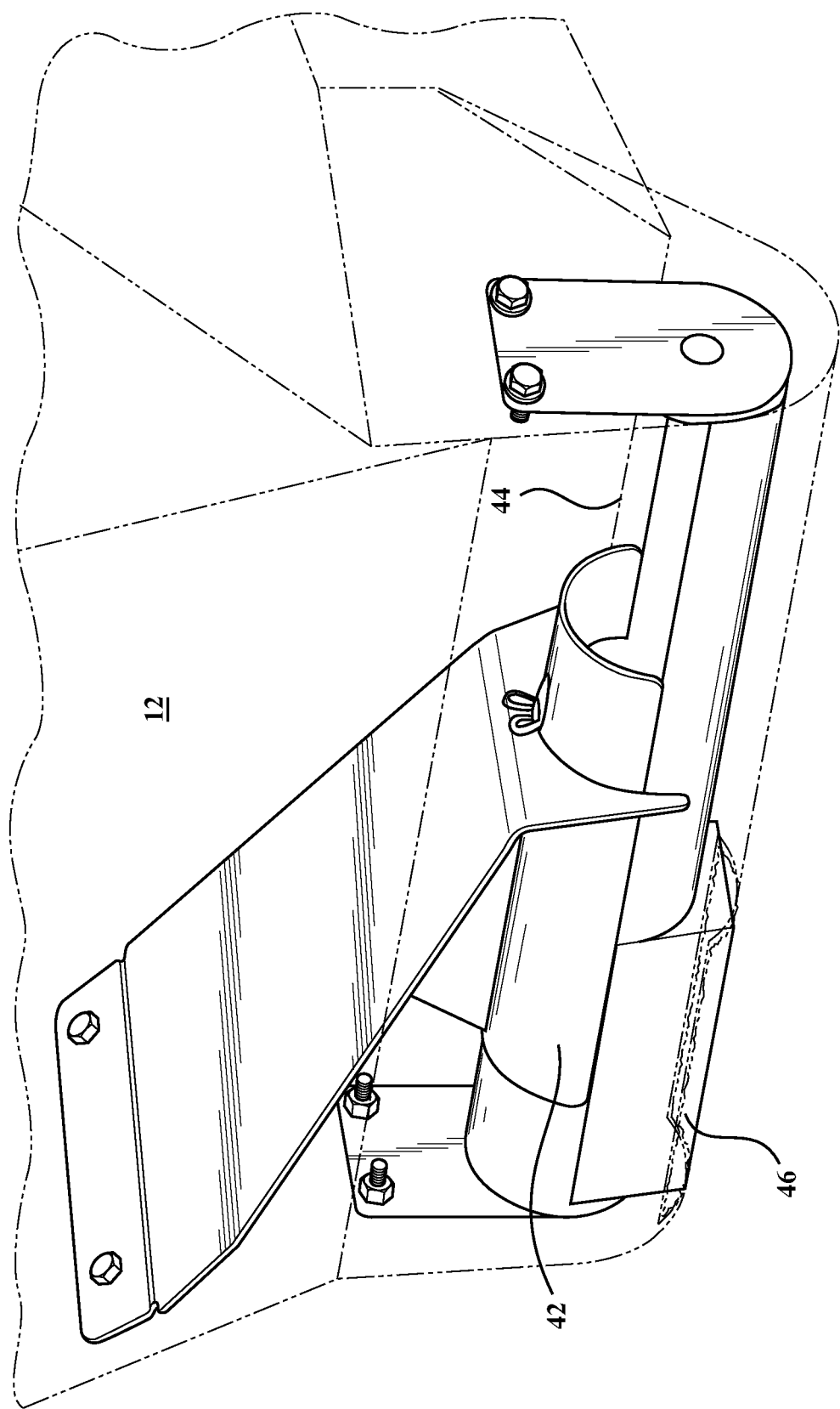
FIG. 4, is a perspective view of a metering system of the present invention.

An alternative embodiment of the metering device is shown in FIG. 4. The alternative embodiment has an auger, (not shown) mounted within a tube 42 with an opening 44 in one end of the tube 42 and a discharge 46 in the opposite end of the tube. In this embodiment, the discharge 46 would discharge into the conditioner 16. The metering device of this embodiment operates by moving material with the auger from the opening 44 to the discharge 46. Material is supplied to the opening 44 from the hopper 12 and then augured to the discharge 46. Since the auger is housed in the tube 42, if the speed of the auger is reduced, the amount of material discharged from the discharge 46 will be reduced. Additionally, if the auger is stopped, all flow is stopped immediately because the material in the augur cannot get past the blades of the auger.

Figure 5:
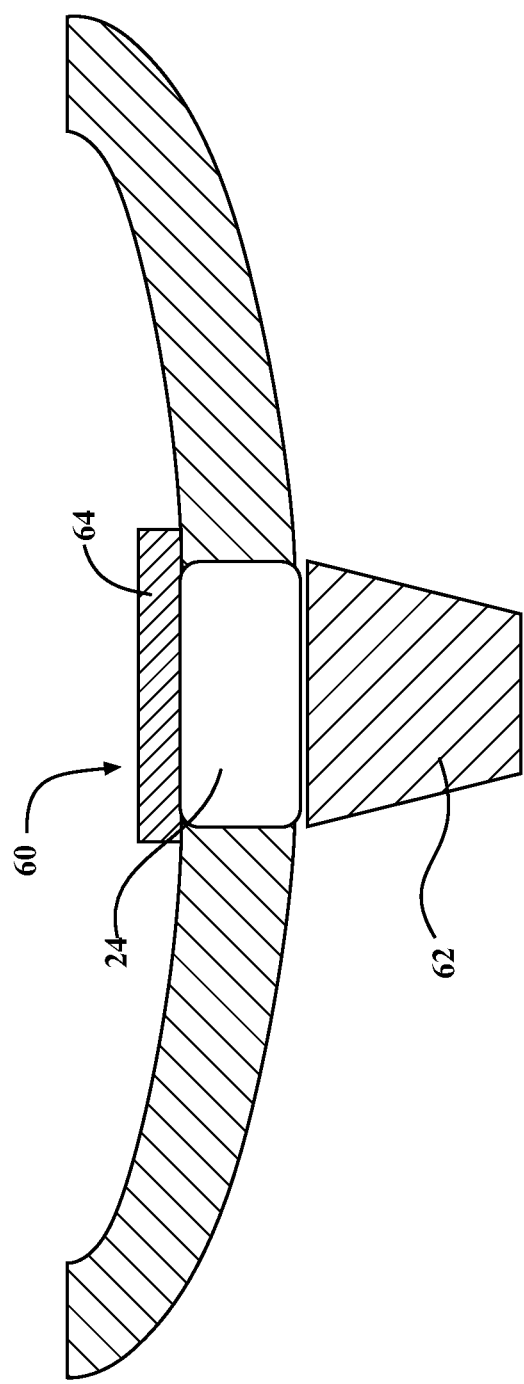
FIG. 5 is a perspective view of the still further alternative metering system of the present invention.

Another alternative embodiment is shown in FIG. 5. The alternative embodiment is a simple gate valve 60 shown schematically. In this embodiment, a chute 62 connects the exit 24 with the conditioner 16. A gate 64 is positioned adjacent the exit 24 to control the discharge of material from the chute 62 to the conditioner 16. The chute 62 can be a half moon shaped chute, or more preferably, a closed chute with the chute being opened and closed by the gate 64. The gate is connected to a solenoid and motor (not shown) and controlling the control unit 15.

Figure 6:
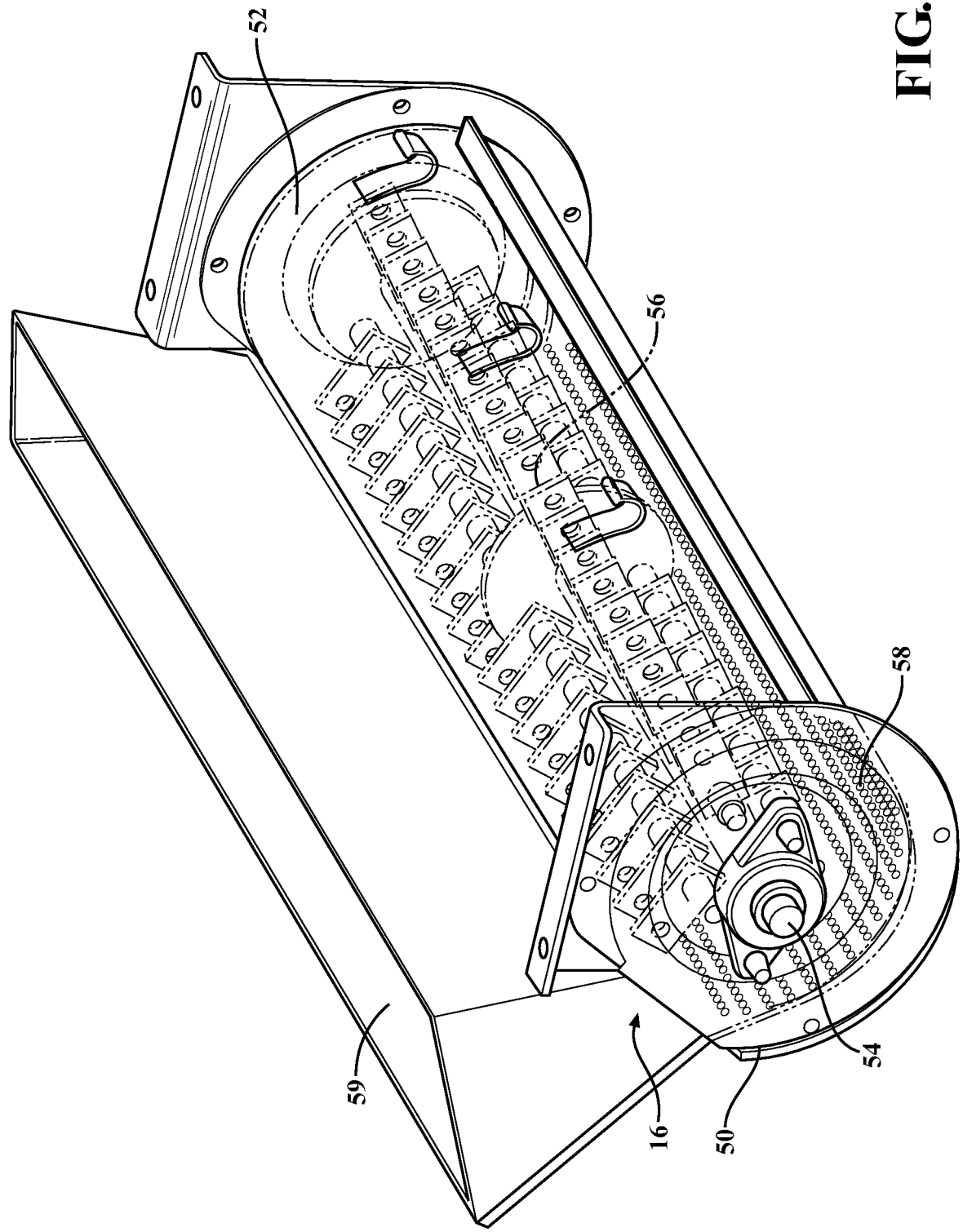
FIG. 6 is a perspective view of a material conditioner.

With reference to FIG. 6, the material conditioner 16 is disclosed as a hammer mill 50. The hammer mill 50 has an outer housing or drum 52 with a horizontal rotating shaft 54 on which hammers 56 are mounted. With reference to FIG. 2, a motor 53 (which can be either 110V or 220V) drives the hammer mill 50. The hammers 56 are free to swing on the shaft 54. As the shaft 54 is spun at a high speed inside the housing, material is fed into housing 52 and impacted by the hammers 56. The hammers 56 crush the material which is then expelled through a screen 58 of a selected size. The inlet of the hammer mill 16 is shown at 59.

Other alternative embodiments of the conditioner 16 could be used, for example, of a rotary concave could be used to condition the material. Rotary concaves are well known to those of ordinary skill in the art and would be used in place of the hammer mill described above.

The mixing bowl 18 receives the conditioned rock salt from the conditioner 16. The mixing bowl 18 has an upper portion 60 with a circular cross section and a conical base section 62. Water inlet nozzles 64 are positioned in the conical base section 62. In the preferred embodiment, the nozzles 64 are angled with respect to each other to create a circular pattern as the water fills the mixing bowl. Due to the metering of the salt as the water enters the mixing bowl 18, the mixing bowl of the present invention can be easily filled with a standard water hose. This is in contrast to all known brine making systems that require a water pump and large water pipes, 2 to 2½ inch pipes to fill the mixing tank.

Circulating tubing 66 is positioned near the conical base section 62 to circulate the water and further mix the conditioned salt as it is added to the water as the water is added to the mixing bowl 18. Nozzles 68 are placed around the interior of the mixing bowl 18 to circulate the water and salt and if desired, additives. A pump 70 is used to circulate the water and salt mixture. The pump draws water from the inlet 72 and then pumps it into the tubing 66 and out the nozzles 68 to circulate the water and mix the water and salt mixture.

The mixing bowl 18 includes a drainpipe 74 to drain the mixing bowl 18 for cleaning purposes. Due to the processing of the rock salt prior to its introduction into the mixing bowl 18, there is a relatively small amount of debris left in the bowl 18 when compared to traditional brine making systems. Additionally, the conditioning of the rock salt also processes the debris contained in the salt, reducing large debris pieces into smaller pebbles that are easy to wash from the mixing bowl when the mixing bowl is cleaned. This process will be discussed in greater detail below.

In the disclosed embodiment, a storage tank 80 is mounted adjacent the mixing bowl 18 to store the brine once it is produced. A supply pipe 82 extends from the mixing bowl 18 to the storage tank 80. The storage tank has a discharge valve 84 for pumping the brine from the tank 80 to the vehicle tanks or other storage tanks. As will be appreciated by those of ordinary skill in the art, the storage tank 80 could take many forms, including bulk storage tanks, in-ground storage tanks, or even a direct pipe connection to other storage tanks, etc. In the disclosed embodiment, the storage tank 80 is generally L-shaped, having a head portion 90 and a base 92. As disclosed, the base 92 supports the mixing bowl 18. In the disclosed embodiment, the mixing bowl 18 and base 92 are separate individual parts, but could be a single unitary part.

In use, the material mixing system 10 is started by initiating the start function of the programmable control unit 15. If the mixing bowl is empty, due either to it being the initial startup or a startup after the cleaning cycle, the metering device 14 and processor 16 are started, and water is introduced into the mixing bowl 18. At startup, the percent of salt being introduced to the mixing bowl 18 is greater than what is required to make brine. The addition of a greater amount of salt is continued for a period of time to create a salt reserve on the bottom of the mixing bowl 18. When the water level reaches inlet 72, the circulating pump 70 is started by the control unit 15 and circulates the water and salt. As the mixture circulates, the sensor 17 continuously reads and sends the salinity measurement to the control unit 15 which then controls the amount of water and salt being introduced to the mixing bowl to create the desired ratio of salt to water. It is important to note that due to the greater percentage of salt at the initial filling of the mixing bowl 18, a salt reserve is created on the bottom of the mixing bowl 18. This salt reserve dissolves or is replenished continually as needed to aid in keeping the salinity of the brine mixture at the desired ratio. Once the desired ratio is achieved, the brine can then be continually produced or batch produced.

The invention also has a clean up mode. The clean up mode is initiated by initiating the cleanup function on the control unit 15. Once cleanup is initiated, the metering device 14 and conditioner are stopped. The circulation pump 70 is started and circulates the brine mixture within the mixing bowl 18. Due to the salt reserve dissolving in the bottom of the mixing bowl 18 due to the circulating brine mixture, the salinity will increase. When the salinity increases the control unit 15 signals for the addition of more water. As water is added, the salinity will lower, resulting in the control unit signaling the water to stop. In the disclosed embodiment, circulating pump continues to run for approximately 30 minutes after the salinity has lowered. As the brine circulates, the salt reserve dissolves and the salinity increases. This process is repeated until the salinity does not increase, after which the control unit stops the circulating pump 70.

Once the circulating pump has stopped, the drainpipe 74 is opened and the mixing bowl 18 is drained. Due to the repeated water circulation and water addition steps, there is very little if any salt remaining in the mixing bowl making cleanup easy as well as using all the available conditioned salt, which is more economical. The material left in the mixing bowl 18 is mainly debris, which due to the conditioning step are small pebbles. Water can be circulated or a hose can be used to wash the debris out of the mixing bowl 18 through the drainpipe 74. The pebbles are easily washed from the mixing bowl due to their size and shape from the conditioning step.

Referring to the Figures, wherein like numerals indicate corresponding parts throughout the several views, Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. A mixing unit for mixing a dry material and a liquid to produce a liquid mixture comprising:
    a hopper adapted to contain a quantity of bulk dry material, said bulk dry material comprising separate individual units of material, said hopper having a first opening for receiving said non-uniform units of material and a second opening for discharging said units of material;
    a metering device positioned adjacent said second opening metering said units of material from said hopper to a bulk dry material conditioner;
    a bulk dry material conditioner adapted to receive said individual units of material from said metering device, said bulk dry material conditioner conditioning said units of material to form conditioned units of material: said conditioned units of material being smaller and more uniform than said non-uniform units of material for easier mixing with liquid;
    said metering device including a shaft with protrusions extending radially outwardly from said shaft, said protrusions moving said non-uniform units of material from within said hopper to said bulk dry material conditioner as said shaft rotates, said protrusions are positioned longitudinally along said shaft; and
    a mixing bowl having at least one water inlet for supplying water to said mixing bowl, said conditioned separate individual units of material being fed into said mixing bowl to mix with said water to form a desired liquid mixture of said liquid and said conditioned units of material, said mixing bowl having an outlet adapted to discharge said desired liquid mixture,
    whereby said desired liquid mixture can be produced at pre-determined discharge rates.

2. The mixing unit of claim 1, wherein said protrusions are a plurality of fingers extending along said shaft in longitudinally extending rows, each finger having a space between it and each adjacent finger and each finger of each row being positioned adjacent a space of the next circumferentially spaced row.

3. The mixing unit of claim 1, wherein the metering device comprises an auger, said auger having a first end operatively connected to a motor for rotating said auger and a second end, said second end being positioned adjacent said second opening of said hopper, said auger receiving said non-uniform units of material from said hopper and moving said non-uniform units of material to said second opening as said auger rotates.

4. A mixing unit of claim 3, further including a tube, said auger extending within said tube, said tube having a discharge opening to discharge said non-uniform units of material to said conditioner.

5. A mixing unit of claim 1, further including a motor operatively connected to said metering device and a controller operatively connected to said motor, said controller controlling said motor to meter said non-uniform units of material from within said hopper to said bulk dry material conditioner as required for maintaining said desired liquid mixture.

6. A mixing unit of claim 5, further including a sensor mounted within said mixing bowl, said sensor communicating with said controller to control said desired liquid mixture.

7. The mixing unit of claim 1, wherein said bulk dry material conditioner is a hammer mill.

8. The mixing unit of claim 1, further including a vibrator mounted within said hopper to facilitate said discharge of said units of material to said metering device.

9. The mixing unit of claim 8, wherein said vibrator includes a plate mounted adjacent to said metering device.

10. The mixing unit of claim 1, wherein said mixing bowl includes a plurality of nozzles positioned about said mixing bowl to circulate the water to facilitate mixing of said conditioned units of material and water.

11. The mixing unit of claim 1, wherein said mixing bowl has a concave bottom section.

12. The mixing unit of claim 1, further including a pump connected to said at least one water inlet to circulate water within said mixing bowl.

13. The mixing unit of claim 1, further including a storage tank operatively coupled to said mixing bowl, said mixing bowl discharging said desired liquid mixture to said storage tank.

* * * * *